United States Patent [19]

Yamamura et al.

[11] Patent Number: 5,146,301
[45] Date of Patent: Sep. 8, 1992

[54] TERMINAL ELECTRODE STRUCTURE OF A LIQUID CRYSTAL PANEL DISPLAY

[75] Inventors: Keiji Yamamura, Miwa; Takashi Nukii, Suzaku; Shigeo Nakabu, Nara Heights, all of Japan

[73] Assignee: Sharp Kabushiki Kaisha, Osaka, Japan

[21] Appl. No.: 257,865

[22] Filed: Oct. 14, 1988

[30] Foreign Application Priority Data

Oct. 15, 1987 [JP] Japan .................. 62-260693

[51] Int. Cl.⁵ .................. H01L 27/01; G02F 1/13
[52] U.S. Cl. .................. 357/23.7; 357/2; 357/4; 359/54; 359/59; 359/87
[58] Field of Search .................. 357/17, 23.7, 4, 2; 350/336, 334, 333

[56] References Cited

U.S. PATENT DOCUMENTS

| | | | |
|---|---|---|---|
| 4,469,568 | 9/1984 | Kato et al. | 357/4 |
| 4,586,789 | 5/1986 | Kishimoto et al. | 350/333 |
| 4,601,097 | 7/1986 | Shimbo | 357/4 |
| 4,624,737 | 11/1986 | Shimbo | 357/4 |
| 4,704,002 | 11/1987 | Kikuchi et al. | 350/334 |
| 4,723,838 | 2/1988 | Aoki et al. | 357/4 |
| 4,803,536 | 2/1989 | Tuan | 357/4 |
| 4,821,092 | 4/1989 | Noguchi | 357/23.7 |
| 4,990,460 | 2/1991 | Moriyama | 350/333 |

FOREIGN PATENT DOCUMENTS

| | | | |
|---|---|---|---|
| 62289 | 10/1982 | European Pat. Off. | 350/333 |
| 58-106522 | 12/1981 | Japan . | |
| 59-128519 | 1/1983 | Japan . | |
| 58-126518 | 7/1983 | Japan | 350/334 |
| 58-147069 | 9/1983 | Japan | 357/23.7 |
| 58-219524 | 12/1983 | Japan | 350/336 |
| 59-7342 | 1/1984 | Japan | 350/334 |
| 59-115564 | 7/1984 | Japan | 357/4 |
| 59-152421 | 8/1984 | Japan | 350/336 |
| 59-163871 | 9/1984 | Japan | 357/4 |
| 60-39617 | 3/1985 | Japan | 350/336 |
| 60-117690 | 6/1985 | Japan | 357/4 |
| 60-185927 | 9/1985 | Japan | 350/336 |
| 61-32471 | 2/1986 | Japan | 357/4 |
| 61-208876 | 9/1986 | Japan | 357/4 |
| 61-228421 | 10/1986 | Japan | 350/334 |
| 62-69238 | 3/1987 | Japan | 350/336 |
| 62-69239 | 3/1987 | Japan | 350/336 |
| 62-76545 | 4/1987 | Japan | 357/4 |
| 62-124530 | 6/1987 | Japan | 350/336 |
| 62-239580 | 10/1987 | Japan | 357/4 |
| 2118774A | 11/1983 | United Kingdom | 357/23.7 |

OTHER PUBLICATIONS

Great Britain Application No. GB-A-2 032 127 to Nishimura et al. Sep. 18, 1979.
German Patent Application No. DE-A-3 306 535 to Takeda et al. dated Feb. 25, 1982.

*Primary Examiner*—Rolf Hille
*Assistant Examiner*—Minhloan Tran

[57] ABSTRACT

A liquid-crystal panel includes a plurality of thin-film transistors. Terminal electrodes associated with gate bus lines which connect the gate electrodes of the thin-film transistors include a layer that is made of an electrode material used for the gate electrode, and a transparent conductive coating formed on the layer. This structure produces a stable connection at the terminal electrode of the gate electrode providing the liquid-crystal panel with excellent display qualities and a high reliability.

3 Claims, 3 Drawing Sheets

TERMINAL ELECTRODE STRUCTURE OF A LIQUID CRYSTAL PANEL DISPLAY

BACKGROUND OF THE INVENTION

1. Field of the Invention

This invention relates to a liquid-crystal panel having insulated-gate thin-film transistors, and more particularly, to a structure of a terminal electrode for the gate electrode of the thin-film transistor.

2. Description of the Prior Art

By the use of amorphous silicon for the semiconductor layer which is combined with an anodic oxidation film to form the gate insulator film, it is possible to obtain a thin-film transistor (TFT) having excellent characteristics. In Japanese Laid-Open Patent Application No. 58-147069, the following characteristics for this structure have been described: (1) excellent insulating qualities (because are no pinholes) having superior reliability and high-voltage resistance; (2) small mobile-ion density; (3) small interface state density of the semiconductor; and (4) large field effects upon the semiconductor.

The process for the production of a liquid-crystal panel having such TFTs will be described hereinafter in detail with reference to the figures. FIG. 2 is a sectional view showing a basic structure of the TFT. A film of Ta is deposited on the top of the glass substrate 1, and gate electrodes 2a, gate bus lines 2b and terminal electrodes 3, are formed in a fixed pattern by a photolithography process (see FIG. 3). Then, by the photolithography process, only the gate electrodes 2a treated by anodic oxidation are exposed, and the glass substrate is immersed in an aqueous solution of ammonium tartrate for the anodic oxidation. The anodic oxidation forms a film of $Ta_2O_5$ having a thickness of 1000 Å by applying a constant voltage of 6.5 V. As a result, a gate electrode 2a of Ta and a first insulator film 4 that is made of a thin oxide film formed on the entire surface of the gate electrode 2a are obtained. On the top of the first insulator film 4, a second insulator film 5 is deposited to form a film of $Si_3N_4$ having a thickness of 1000 Å by CVD method or a sputtering method. For the second insulator film 5, it is possible to use $SiO$, $SiO_2$, $Y_2O_3$, $Al_2O_3$, $MgF_2$, or the like, instead of $Si_3N_4$. The second insulator film 5 functions to protect the anodic oxidation film made of $Ta_2O_5$ (that is, the first insulator film 4). The first insulator film 4 and the second insulator film 5 together form the gate insulator film. Next, for the semiconductor layer 6, a layer of amorphous silicon having a thickness of 3000 Å is deposited by glow discharge, and then a layer of Ti having a thickness of 3000 Å is deposited to form the source electrode 7 and the drain electrode 8, and the finished TFT results.

Thereafter, the transparent conductive coating 9 that is made of, for example, indium tin oxide (ITO) forms the picture elements. A layer of $Si_3N_4$ having a thickness of 3000 Å deposited by CVD method to form a protective film 10. The protective film 10 does not function only to protect the layer of amorphous silicon, but also depletes carriers in the vicinity of the surface of the semiconductor layer 6. Thereby the amount of leakage current in the "off" state is decreased, and the device characteristics of the TFT are greatly improved. Then, an aligning treatment is performed by a polyimide application and rubbing and a liquid-crystal panel is obtained by sealing and filling the device with liquid crystals (not shown).

Thereafter, flexible printed-circuit boards equipped with a driving LSI are connected to the terminal electrodes 3 on the top of the liquid-crystal panel by an anisotropic conductive sheet. The production of a liquid-crystal display module by this method will be explained below. FIG. 4 shows the planar structure of this liquid-crystal display module, and FIG. 5 shows a sectional view taken along line X-X' of FIG. 4. The flexible printed-circuit boards 22 equipped with a liquid-crystal driving LSI 21 are connected to the terminal electrodes on the top of the liquid-crystal panel 23 through an anisotropic conductive sheet that is positioned in the space between the printed-circuit boards 22 and the terminal electrodes. Also, a double-sided printed-circuit board 24 having input signal lines (common wiring) is attached to the opposite face of the flexible printed-circuit boards 22, and a liquid-crystal display module results.

In this case, the Ta of the terminal electrode 3 significantly deteriorates (that is, the electrode is oxidized) by the curing of the polyimide mentioned above (at 200° C. for 2 hours), by the curing of the sealing resin (at 180° C. for 2 hours), or a like process. Therefore, the connection to the flexible printed-circuit board by the anisotropic conductive sheet becomes unstable.

SUMMARY OF THE INVENTION

The liquid-crystal panel of this invention, which overcomes the above-discussed and numerous other disadvantages and deficiencies of the prior art, includes thin-film transistors, having a terminal electrode for a gate electrode that is composed of a layer made of an electrode material used for the gate electrode, and a transparent conductive coating formed on the layer.

In a preferred embodiment, the thin-film transistor has a gate insulator film and an amorphous semiconductor layer formed thereon, the gate insulator film includes an anodic oxidation film formed on the gate electrode and a protective insulator film formed on the anodic oxidation film.

In a preferred embodiment, the transparent conductive coating is made of indium tin oxide (ITO).

In a preferred embodiment, the gate electrode is made of Ta and the anodic oxidation film is made of $Ta_2O_5$.

In a preferred embodiment, the amorphous semiconductor layer is made of amorphous silicon.

Thus, the invention described herein makes possible the objective of providing a liquid-crystal panel having thin-film transistors, in which a terminal electrode for a gate electrode of the thin-film transistor has a two-layered structure. The two-layered structure includes a layer made of an electrode material that can be treated by anodic oxidation to improve the device characteristics of the thin-film transistors, and a transparent conductive coating formed on the layer, so that it is possible to obtain stable connections at the terminal electrode of the gate electrode. Also, the objective of providing a liquid-crystal panel having an excellent display quality and a high reliability because of the stable connections at the terminal electrode for the gate electrode.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1A:
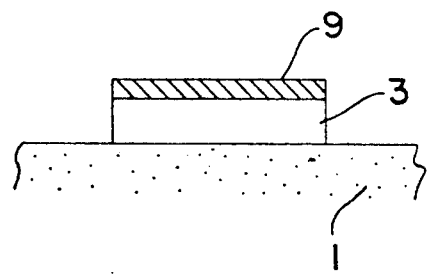
FIGS. 1a and 1b are sectional views showing various structures of terminal electrodes provided in a liquid-crystal panel of an embodiment of the present invention.

The terminal electrode of this invention has a two-layered structure with the ITO film 9 remaining even on the top of the terminal electrode 3 in the process described above, as shown in FIG. 1a and 1b. Because ITO is an oxide, the ITO is stable and does not decompose even at high temperatures of the treatment described above.

After the deposition of the Ta film on the top of the glass substrate 1, a photolithography process is used to form the gate electrodes 2a, the gate bus lines 2b, and the terminal electrodes 3. Then, by a photolithography process, only the gate electrodes 2a treated by anodic oxidation are exposed. The procedure of anodic oxidation, the formation of the second insulator film 5 on the top of the first insulator film 4, the formation of the semiconductor layer 6 made of amorphous silicon, and the formation of the source electrode 7 and the drain electrode 8 are carried out in the same way as in the conventional example described above.

Figure 1B:
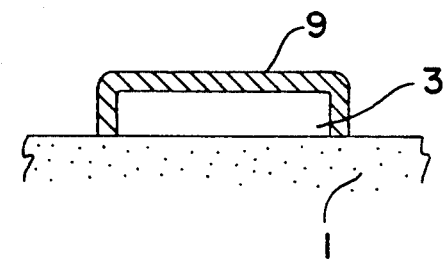
Figure 2:
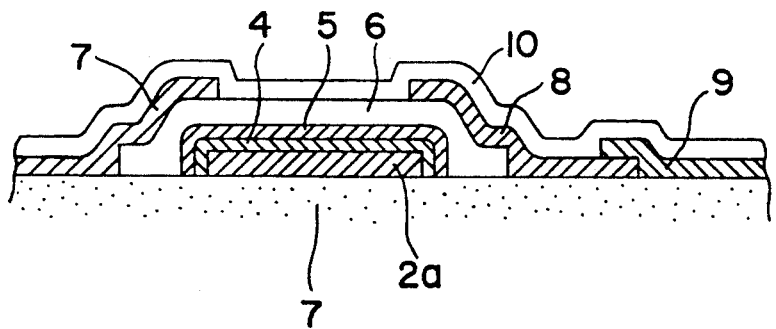
FIG. 2 is a sectional view showing a basic structure of the thin-film transistors provided in a liquid-crystal panel of this invention.
Figure 3:
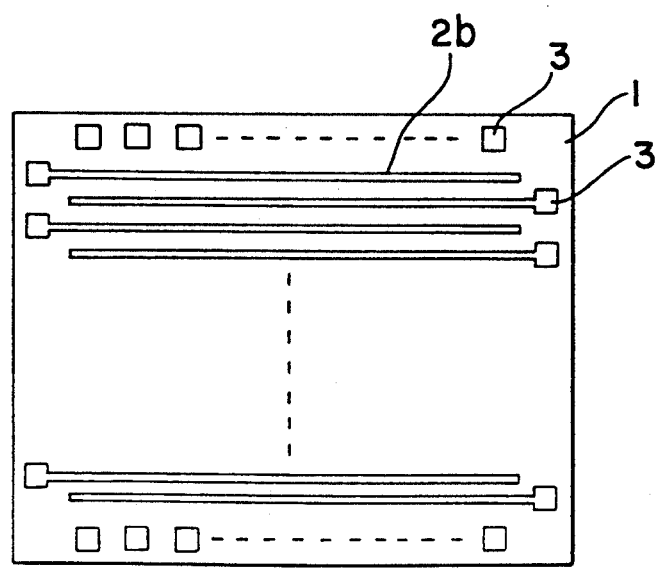
FIG. 3 is a schematic view showing the gate electrodes and terminal electrodes provided in a liquid-crystal panel of an embodiment of the present invention.
Figure 4:
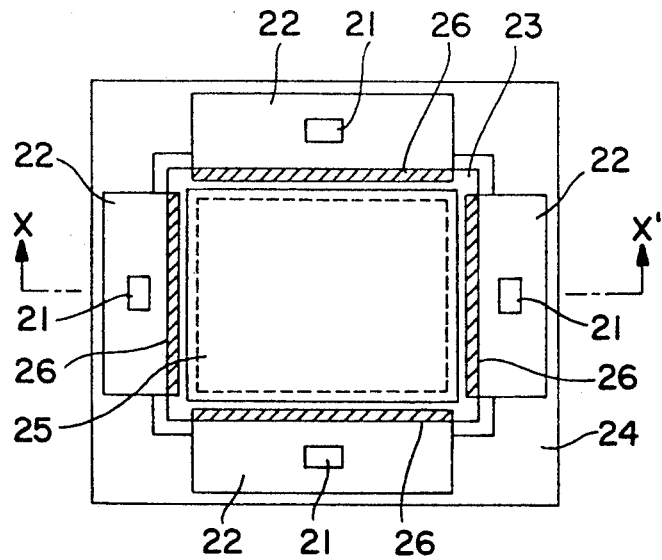
FIG. 4 is a plan view showing a liquid-crystal display module that employs a liquid-crystal panel in an embodiment of the present invention.
Figure 5:
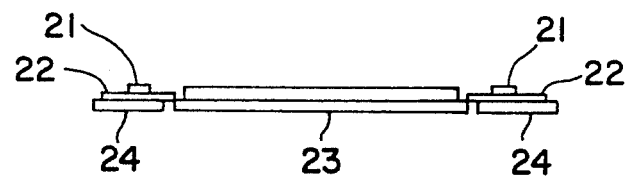
FIG. 5 is a sectional view taken along line X-X' of FIG. 4.

Next, the ITO film 9 forms the picture elements. At this time, the windows of the mask area that correspond to the terminal electrodes 3 are opened, and as shown in FIG. 1a and 1b, the ITO film 9 is formed even on the top of the terminal electrode 3. FIG. 1a shows the case in which the mask window and the terminal electrode 3 are of the same size, and FIG. 1b shows the case in which the mask window is larger than the terminal electrode 3.

Figure 8:
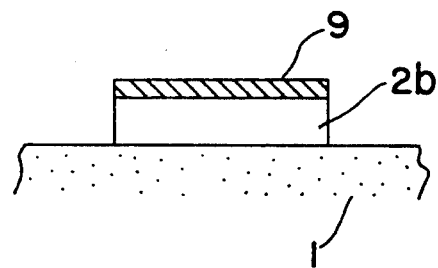
FIG. 8 shows in cross section a gate bus with a transparent coating on top.

In this example, the ITO film 9 is formed on the top of the terminal electrodes 3, but it is also possible for the ITO film to be formed on the top of the gate bus lines 2b as well as shown for example in FIG. 8.

The later steps are the same as in the conventional example given above.

Figure 6:
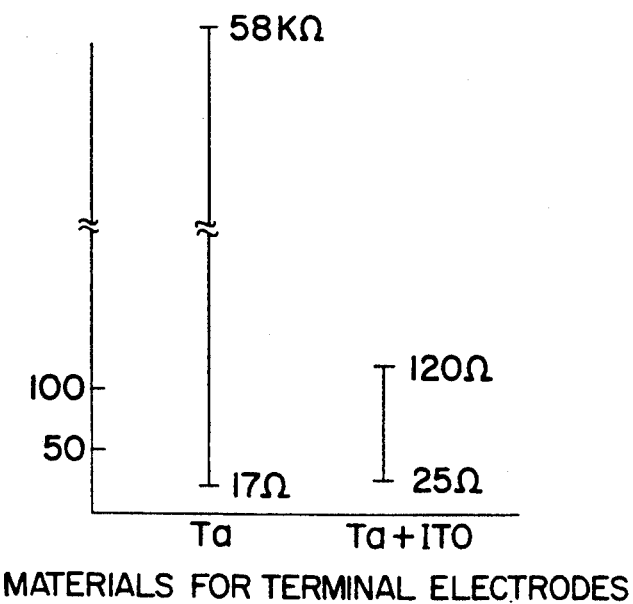
FIG. 6 shows variations in the connection resistance when flexible printed-circuit boards equipped with a driving LSI are connected to the terminal electrodes of a liquid-crystal panel.
Figure 7:
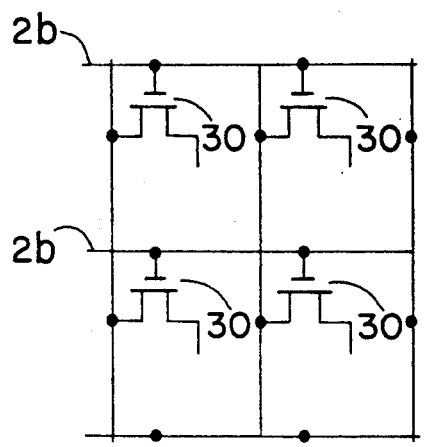
FIG. 7 illustrates a circuit with transistors connected to gate buses.

The liquid-crystal display module obtained in this way was evaluated for the connection resistance of the terminal electrode for the gate electrode. When the flexible printed-circuit boards are connected to the terminal electrodes made of a Ta film of Ta+ITO films, the differences in the stability of the connection resistance are shown in FIG. 6. In each case, 200 liquid-crystal display modules were formed and evaluated. The connecting surface area of the terminal electrode for the gate electrode was $0.1 \times 3$ mm$^2$. When only a Ta film was used for the terminal electrode, diverse values for the connection resistance were obtained within the limits of 17Ω to 58KΩ. When the Ta+ITO film was used for the terminal electrode, substantially constant values ranging from 25 to 120Ω were obtained. As shown in FIG. 6, it is possible to obtain a stable connection between the liquid-crystal panel and the flexible printed-circuit board equipped with a driving LSI by the use of two-layered terminal electrodes having a layer made of an electrode material treated by an anodic oxidation to improve the device characteristics of the thin-film transistors, and a transparent conductive coating made of, for example, ITO. In FIG. 7 there are shown transistors (30) connected to gate buses 2b.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid-crystal panel comprising:
   a plurality of rows of thin-film transistors each of said thin-film transistors having a gate electrode associated therewith;
   a plurality of gate bus lines corresponding to said plurality of rows, the gate electrodes of said thin-film transistors in each of said plurality of rows electrically connected to a gate bus line;
   a plurality of terminal electrodes connected to the terminating ends of each of said plurality of gate bus lines;
   a transparent conductive coating disposed over in direct contact with said plurality of terminal electrodes;
   said thin-film transistors having a gate insulator film and an amorphous semiconductor layer formed thereon;
   wherein said gate insulator film comprises an anodic oxidation film disposed on said gate electrodes and a protective insulator film disposed on said anodic oxidation film.

2. A liquid-crystal panel according to claim 1, wherein said gate electrode comprises Ta and said anodic oxidation film comprises $Ta_2O_5$.

3. A liquid-crystal panel according to claim 1, wherein said protective insulator film comprises $Si_3N_4$, SiO, $SiO_2$, $Y_2O_3$, $Al_2O_3$ or $MgF_2$.

* * * * *